United States Patent

[11] 3,572,731

[72] Inventor Friedhelm Stecher
 Burscheid, Germany
[21] Appl. No. 777,068
[22] Filed Nov. 19, 1968
[45] Patented Mar. 30, 1971
[73] Assignee Goetzewerke
 Burscheid, Germany
[32] Priority Nov. 21, 1967
[33] Germany
[31] P 16 50 026.8

[54] FLANGE SEAL
 11 Claims, 6 Drawing Figs.
[52] U.S. Cl. .................................................. 277/153,
 277/231
[51] Int. Cl. .................................................. F02f 5/00,
 F02f 11/00
[50] Field of Search........................................... 277/153,
 163, 231, 235 (A), 205

[56] References Cited
UNITED STATES PATENTS

| | | | |
|---|---|---|---|
| 2,580,546 | 1/1952 | Hobson, Jr. .................. | 277/231X |
| 2,699,349 | 1/1955 | Brownlee ..................... | 277/231 |
| 3,107,100 | 10/1963 | Rudder......................... | 277/231X |
| 3,174,764 | 3/1965 | Hobson, Jr. .................. | 277/231 |

FOREIGN PATENTS

| | | | |
|---|---|---|---|
| 735,801 | 8/1955 | Great Britain................ | 277/153 |

*Primary Examiner*—Robert M. Walker
*Attorney*—Spencer and Kaye

ABSTRACT: A flange seal for use in sealing flanges between internal-combustion engine parts and the like comprises a sheath member having a channel shaped cross section including two planar arms, a generally U-shaped intermediate portion connecting the arms, resilient supporting means located between the arms, the arms of the sheath, but not the connecting portion being engaged with the flanges of the joint to be sealed.

PATENTED MAR 30 1971                                     3,572,731

Inventor
Friedhelm STECHER

By *Spencer & Kaye*
Attorneys

FLANGE SEAL

BACKGROUND OF THE INVENTION

The present invention relates to seals for flanges and more particularly to a device for sealing the region between planar surfaces of separate parts in internal combustion engines and the like. In the prior art the sealing edge of gaskets used adjacent to combustion chambers have been metallically reinforced. The metallic border of the sealing edges protects soft material, e.g. asbestos webbing, from the hot combustion gases and from the high pressures occurring in the combustion chamber and, also provides a more effective seal by increasing sealing pressure in the area of the reinforcement. The edge reinforcement of the sealing plate often comprises a metal strip which is bent into a U- or C-shape to form two arms which enclose the sealing edge.

In this type of seal, supporting or suspension elements have additional to the gasket itself, sometimes been provided between the two arms of the sheath element in order to increase the elasticity of the sealing ring. Such suspension elements have also been provided for sealing rings comprising U- or C-shaped sheath members used without gaskets in sealing pipelines and the like as well as combustion chambers.

During installation, the sealing thickness is reduced because the sealing gap, i.e., the distance between the two arms of the sleeve decreases as the clamping screws or their equivalent are tightened. Thus, in use the curvature of the portion of the sheath element between the two arms increases. If vibration occurs during operation between the two flanges which the arms contact, bending stresses are created on the curved connecting portion. Such vibrations occur, for example, during the operation of internal-combustion engines as a result of variations in pressure in the area to be sealed and because of imbalances in the engine. These stresses often lead to premature fatigue breaks in the curved region of the sleeve.

In one known type of seal the free arm ends of the sheath element are supported within recesses in the soft material of the gasket. The remaining portions of the arms and the curved portion abut against the sealing surfaces under the pressure created by the deformation of the sleeve element. Because the arm ends are mounted in recesses, undesirable warping of the cylinder walls of the internal-combustion engines is avoided and the curved region of the sleeve is less heavily stressed during installation. However, the continuous contact of both arms with adjacent engine parts causes transfer of vibrations to the sheath element and its durability is reduced, particularly in the curved region.

The uses of other material for the sleeve element or different thicknesses of material is not feasible for economic and particularly spatial reasons. The sealing thickness in the clamped state is often only 1 to 2 mm. Thus, a way must be found to substantially remove vibrations from portions of the sheath element which are likely to break.

SUMMARY OF THE INVENTION

Among the objects of the present invention is the elimination of the tendency of the sleeve element to break due to fatigue stresses.

A further object of the invention is the reduction of the transmission of vibrations to the points of the sheath elements that are likely to break during use.

These and other objects of the invention are accomplished by shaping the cross section of the sheath element in such a way that the inserted supporting element within the sheath acts only on the free arm ends. Only the supported arm ends of the sheath are in sealing contact with adjacent surfaces of the engine parts. The remaining unsupported arm regions and the curved portion of the sheath element extend freely into the sealing gap even subsequent to the plastic deformation which occurs after tightening of the seal. This connecting portion does not continuously contact adjacent vibrating engine surfaces under pressure. Transfer of vibrations from the flanges directly to the curved region is thus impossible. Direct vibration transfer occurs only to the free arm ends which are pressed against vibrating engine surfaces where they form a continuous seal by the resilience of the supporting element disposed between them. There is an indirect transfer of vibrations over the adjacent arm region into the curved region of the sheath element. However, since the vibration width of the sealing gap and its influence on the curved region of the sleeve element is dependent on the unsupported length of the arm disposed therebetween, the vibrational influence can be sufficiently reduced, if the length of the arms is appropriate, so that the sleeve element will no longer break in the area of its sharpest curvature.

According to one embodiment of the invention the sheath element is provided with a generally U-shaped cross section in which the spacing of the legs of the U decreases from the free arm ends to the area of sharpest curvature. The resulting sharp curvature of the sheath element has little adverse effect since the element is made of relatively soft material, for example a copper or aluminum alloy, and the deformation is purely plastic and no further deformation occurs during the later operational state.

According to another embodiment of the invention the cross-sectional width of the sheath element is reduced in steps, the steps being provided in one or both sheath element arms. If the reduction in size occurs in one side only the other arm of the sheath element contacts the adjacent surface over its entire length. Vibrations are transferred to the entire sheath element, but they do not lead to a permanent change in curvature of the element and thus do not place additional stresses on the same.

According to another embodiment of the invention the cross section of the sheath element remains unchanged but the diameter of the annular sealing edge of the gasket used with it is appropriately reduced so that in the installed state the portion of the sheath element which is not in contact with the supporting element and the adjacent engine parts freely extends into the chamber to be sealed.

According to another embodiment of the invention a constriction is placed in the arms of the sheath element in the form of crimps or the like so as to hold the supporting or suspension element in place, and to center the sheath element in use.

DESCRIPTION OF THE PREFERRED EMBODIMENTS

Figure 1:
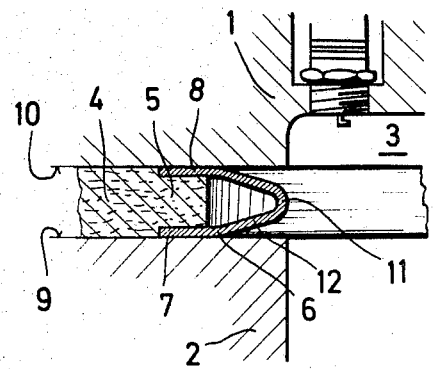
FIG. 1 is a sectional view of the head and block of an internal-combustion engine having a gasket and an associated sheath element installed therein.

FIG. 1 shows a gasket 4 of soft material installed between the cylinder head 1 and the cylinder block 2. The edge 5 of this gasket facing the combustion chamber 3 is metallically armored in order to shield the soft material, e.g., asbestos webbing, from the hot combustion gases and from the high pressures. The metallic armor consists of a metal strip having a V-shaped cross section whose two arms 7, 8, which are parallel to each other, enclose the edge 5 of the soft gasket 4 and form a seal at the flange surfaces 9, 10 of the cylinder block 2 or of the cylinder head 1, respectively. The end 5 of the soft gasket which extends between the arms 7, 8 here acts as a resilient supporting member. Between the two arms 7, 8 and the curved region 11 of the sleeve 6 a further unsupported sheath portion 12 extends which does not abut against the flange surfaces 9, 10. During vibrations of the sealing gap, i.e., during a continuously changing distance between the two arms 7, 8 the vibrations at the endangered sleeve portions are reduced by the lever action of the free length of the arms and thus do not lead to premature fatigue breaks.

Figure 2:
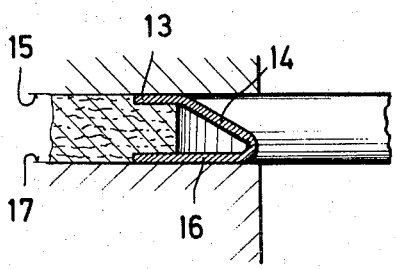
FIG. 2 is a sectional view similar to FIG. 1 of a gasket and an associated sheath element in which all curvature of the sheath element occurs on one side.

In the embodiment according to FIG. 2 the cross section of the sleeve is so constructed that only one arm 13 with its unsupported portion 14 is lifted off a countersealing surface 15 whereas the other arm 16 rests against the sealing surface 17 over its entire length.

Figure 3:
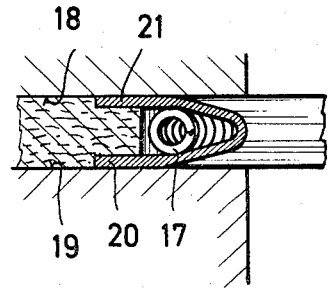
FIG. 3 is a sectional view similar to FIG. 2 of still another embodiment of the invention in which a metallic coil spring is inserted between the arms of the sheath element to provide additional biasing effect.

FIG. 3 shows a cross section through a sealing edge similar to FIG. 1. The only difference is that a coil spring element 17 is here provided between the two arms 20, 21 which are in sealing contact with the flange surfaces 18, 19.

Figure 4:
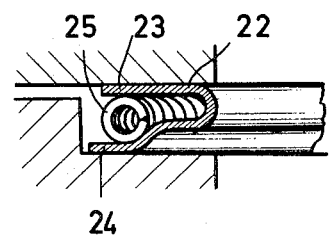
FIG. 4 is a sectional view similar to FIG. 2 in which the connecting portion of the sheath member between the arms decreases in size in steps.

The flange seal according to FIG. 4 comprises only a sheath 22 having an approximately U-shaped cross section which decreases in steps on the one side, a spring element in the form of an annular coil spring 25 being inserted between the two sealing arm ends 23, 24. No internal gasket of soft material is provided, but it may be, as well as in the embodiments shown in FIGS. 5 and 6.

Figure 5:
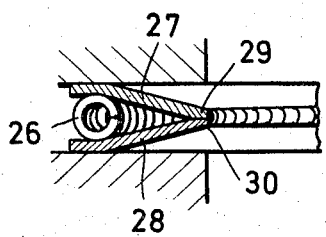
FIG. 5 is a sectional view similar to FIG. 2 in which the sheath element is formed of separate metallic plates joined by welding.

In the embodiment shown in FIG. 5 the sheath partially enclosing the resilient element 26 comprises two metal strips 27, 28 having an approximately S-shaped profile. Its contacting arm ends 29, 30 are tightly connected with each other over the entire periphery, for example, by welding. This embodiment has the advantage that the sleeve is not disproportionately stressed by too sharp a curvature at any point.

Figure 6:
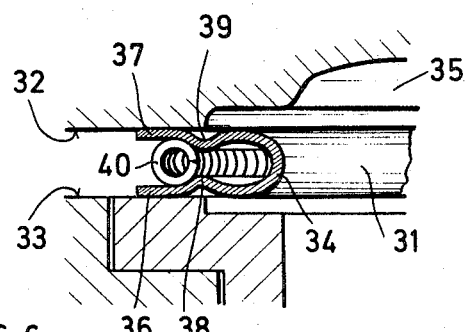
FIG. 6 is a sectional view similar to FIG. 2 in which a constriction is provided in the arms in order to hold the supporting element in place.

The sealing ring 31 shown in FIG. 6 has a much smaller diameter than those described above so that the sleeve portion 34 which does not rest against the flange surfaces 32, 33 freely extends into the combustion chamber 35 to be sealed. The inserted spring element 40 is centered by two crimps 38, 39 provided in the arms 36, 37 of the sleeve. Since the sleeve portion 34 freely extends into the combustion chamber its curvature may be equal to or greater than the size of the sealing gap.

It will be apparent that there has been provided a flange seal in which transmission of vibrations to the connecting portion joining the flanges is substantially reduced, and in which the possibility of failure through fatigue is less likely.

It will be understood that the above description of the present invention is susceptible to various modifications changes and adaptations.

I claim:

1. In a flange seal subjectable to hot combustion gases and high pressures for sealing the joint between planar flange surfaces of adjacent parts of internal-combustion engines and the like of the type comprising a metallic channel-shaped sheath element having in cross section at its free ends a pair of planar arms and a resilient supporting element disposed between the planar arms the improvement in which only the planar arms of the sheath element are in contact with the adjacent flange surfaces, in which the portion of the sheath element connecting said arms is out of contact with the adjacent flanges in the operative position, and in which the resilient supporting element is present between the planar arms up to, and not beyond, the point at which the contact between the sheath element and the flange surfaces is lost with the beginning of the connecting portion.

2. The structure of claim 1 in which the intermediate connecting portion of the sheath is generally U-shaped in cross section and in which the spacing of the legs of the U decreases from the region of the planar arms to a curved area joining the legs of the U.

3. The structure of claim 2 in which the said U-shaped cross section tapers uniformly from said planar arms to the said curved area.

4. The structure of claim 2 in which the legs of the said U decreases in spacing in steps between the said planar arms and the said curved area.

5. The structure of claim 2 in which one leg of the said U-shaped connecting portion is substantially planar with the adjacent planar arm and the other leg extends to the other planar arm.

6. The structure of claim 1 in which the intermediate connecting area extends into a chamber to be sealed.

7. The structure of claim 1 in which a constriction is formed in the sheath element adjacent each of the planar arms and extends toward the opposite planar arm and in which the resilient means have greater cross-sectional dimensions than the distance between the constrictions in the engaged position of the seal and are positioned in engagement with the planar arms and the constrictions but not said connecting portion whereby the resilient supporting element is held in position by the constrictions.

8. The structure of claim 1 in which the resilient means is a sealing gasket.

9. The structure of claim 1 in which the resilient means is a spring element.

10. The structure of claim 1 in which the resilient means is a coil spring arranged with its axis substantially parallel to the plane of the arms of the sheath element.

11. The structure of claim 1 in which the sheath element comprises separate plates, each having an arm portion and a connecting portion, and means joining the edges of the connecting portion of each plate.